(12) United States Patent
Mao et al.

(10) Patent No.: US 12,051,957 B2
(45) Date of Patent: Jul. 30, 2024

(54) LINEAR VIBRATION MOTOR

(71) Applicant: AAC Microtech (Changzhou) Co., Ltd., Changzhou (CN)

(72) Inventors: Lubin Mao, Shenzhen (CN); Zhiyong Cui, Shenzhen (CN); Jie Ma, Shenzhen (CN); Ziang Li, Shenzhen (CN); Yao Wang, Shenzhen (CN)

(73) Assignee: AAC MICROTECH (CHANGZHOU) CO., LTD., Changzhou (CN)

( * ) Notice: Subject to any disclaimer, the term of this patent is extended or adjusted under 35 U.S.C. 154(b) by 298 days.

(21) Appl. No.: 17/833,755

(22) Filed: Jun. 6, 2022

(65) Prior Publication Data

US 2023/0378862 A1 Nov. 23, 2023

(30) Foreign Application Priority Data

May 18, 2022 (CN) ......................... 202221228964.8

(51) Int. Cl.
*H02K 33/16* (2006.01)
*B06B 1/04* (2006.01)
*H02K 33/18* (2006.01)

(52) U.S. Cl.
CPC ............. *H02K 33/16* (2013.01); *B06B 1/045* (2013.01); *H02K 33/18* (2013.01)

(58) Field of Classification Search
CPC ......... B06B 1/045; H02K 33/16; H02K 33/18
See application file for complete search history.

(56) References Cited

U.S. PATENT DOCUMENTS

| | | | |
|---|---|---|---|
| 2020/0044543 A1* | 2/2020 | Tang | H02K 33/18 |
| 2020/0044547 A1* | 2/2020 | Tang | H02K 33/18 |
| 2020/0044548 A1* | 2/2020 | Tang | H02K 33/18 |
| 2020/0212776 A1* | 7/2020 | Ling | H02K 33/16 |
| 2020/0212779 A1* | 7/2020 | Tang | H02K 33/16 |
| 2020/0304005 A1* | 9/2020 | Mao | H02K 33/16 |
| 2020/0412227 A1* | 12/2020 | Mao | G06F 3/016 |
| 2021/0021185 A1* | 1/2021 | Cui | H02K 41/0354 |

* cited by examiner

*Primary Examiner* — Gary A Nash
(74) *Attorney, Agent, or Firm* — W&G Law Group (57) ABSTRACT

The present invention provides a linear vibration motor, including a housing with a receiving space; a vibration unit arranged in the receiving space; an elastic member that suspends the vibration unit in the receiving space; and a coil assembly fixed to the housing and driving the vibration unit to vibrate. Compared with the related art, the linear vibration motor of the present invention is easy to assemble and good in vibration performance.

14 Claims, 7 Drawing Sheets

LINEAR VIBRATION MOTOR

TECHNICAL FIELD

The present invention relates to a motor, in particular to a linear vibration motor applied to the field of mobile electronic products.

BACKGROUND

With the development of electronic technologies, portable consumer electronic products are more and more popular, such as mobile phones, handheld game machines, navigation devices, or handheld multimedia entertainment equipment. These electronic products generally use a linear vibration motor for making a system feedback, such as call alert of a mobile phone, an information prompt, a navigation prompt, and a vibration feedback of a game machine. In such widespread applications, the vibration motor is required to have good performance and long service life.

A linear vibration motor of the related art includes a housing with a receiving space, a vibration unit located in the receiving space, an elastic member that fixes and suspends the vibration unit in the receiving space, and a coil assembly fixed to the housing. The vibration unit includes a mass block, an electrode core, and a magnet. The coil assembly includes a coil and an iron core. A magnetic field generated by the coil interacts with a magnetic field generated by the vibration unit, thereby driving the vibration unit for doing reciprocating linear motion for generating vibration.

However, in the linear vibration motor of the related art, two end surfaces of an iron core body are arranged to be flush with an outside surface of an iron core extension portion in a direction perpendicular to a vibration direction of the vibration unit, without recess and bulge features, so that it is difficult to quickly align the coil assembly in an assembling process, and the assembling difficulty is high.

Therefore, it is necessary to provide a new linear vibration motor to solve the above problems.

SUMMARY

The present invention aims to provide a linear vibration motor which is easy and convenient for assembling and has good vibration performance.

In order to achieve the above objective, the present invention provides a linear vibration motor, including a housing with a receiving space; a vibration unit arranged in the receiving space; an elastic member that suspends the vibration unit in the receiving space; and a coil assembly fixed to the housing and driving the vibration unit to vibrate. The vibration unit includes a mass block with a through hole, and a magnet received in the through hole; the coil assembly includes an iron core inserted into the through hole and spaced apart from the magnet, and a coil fixed to the iron core; the iron core includes an iron core body used for winding the coil, and two iron core extension portions sleeved at two ends of the iron core body; the two iron core extension portions include a first iron core extension portion and a second iron core extension portion; the two iron core extension portions extend perpendicular to a vibration direction of the vibration unit until the two portions are fixed to the housing; surfaces of the two iron core extension portions that respectively face away from the other iron core extension portions along the vibration direction are outside surfaces, and surfaces of the two iron core extension portions that face to the other iron core extension portions along the vibration direction are inside surfaces; a surface distance between the two outside surfaces of the two iron core extension portions is d1; a surface distance between two end surfaces of the iron core body along the vibration direction is d2; and the d1 and the d2 satisfy a conditional expression: d1/d2.

Preferably, the d1 and the d2 satisfy a conditional expression: d1<d2.

Preferably, a surface distance between the two inside surfaces of the two iron core extension portions is d3, and the d1, the d2, and the d3 satisfy a conditional expression: d3<d2<d1.

Preferably, the coil is wound on the iron core body along the vibration direction; and an orthographic projection of the coil on a plane perpendicular to the vibration direction at least overlaps orthographic projections of the iron core extension portions.

Preferably, a geometric center of each iron core extension portion overlaps a geometric center of the coil in the vibration direction.

Preferably, the magnet includes a first magnet, and a second magnet opposite to the first magnet; and the first magnet and the second magnet are magnetized perpendicular to the vibration direction and have opposite magnetic poles.

Preferably, the first magnet is provided with a first magnetizing region, a second magnetizing region, and a third magnetizing region in sequence along the vibration direction; the first magnetizing region, the second magnetizing region, and the third magnetizing region are magnetized perpendicular to the vibration direction; magnetizing directions of the first magnetizing region and the second magnetizing region are opposite, and a first non-magnetic region is arranged between the first magnetizing region and the second magnetizing region; and magnetizing directions of the second magnetizing region and the third magnetizing region are opposite, and a second non-magnetic region is arranged between the second magnetizing region and the third magnetizing region.

Preferably, the second magnet is provided in sequence, along the vibration direction, with a fourth magnetizing region, a fifth magnetizing region, and a sixth magnetizing region that have opposite magnetic poles to the first magnetizing region, the second magnetizing region, and the third magnetizing region; the fourth magnetizing region, the fifth magnetizing region, and the sixth magnetizing region are magnetized perpendicular to the vibration direction; magnetizing directions of the fourth magnetizing region and the fifth magnetizing region are opposite, and a third non-magnetic region is arranged between the fourth magnetizing region and the fifth magnetizing region; and magnetizing directions of the fifth magnetizing region and the sixth magnetizing region are opposite, and a fourth non-magnetic region is arranged between the fifth magnetizing region and the sixth magnetizing region.

Preferably, the mass block is made of a non magnetically permeable material.

Compared with the prior art, the linear vibration motor of the present invention has the advantages that the surface distance d1 between the two outside surfaces of the two iron core extension portions that face away from the other iron core extension portions along the vibration direction and the surface distance d2 between the two end surfaces of the iron core body along the vibration direction are set to be unequal values, so that the end portions of the iron core on the plane perpendicular to the vibration direction have recess and bulge features. According to the linear vibration motor, without affecting other preparation processes, the recess and bulge features are provided on the end portions of the iron core, so that the coil assembly is easier to locate and assemble. Meanwhile, when the d1, d2, and d3 satisfy d3<d2<d1, the attraction of the magnet in the vibration direction to the iron core can be reduced. When the d1 and the d2 satisfy d1<d2, a driving force of the vibration unit in the vibration direction of the linear motor can be increased, so that the linear vibration motor has good vibration performance.

BRIEF DESCRIPTION OF THE DRAWINGS

In order to describe the technical solutions in the embodiments of the present invention more clearly, accompanying drawings required to be used in the descriptions of the embodiments will be briefly introduced below. Obviously, the drawings in the illustration below are merely some embodiments of the present invention. Those ordinarily skilled in the art also can acquire other drawings according to the provided drawings without doing creative work.

DETAILED DESCRIPTION OF THE EMBODIMENTS

The technical solutions in the embodiments of the present invention will be described clearly and completely below with reference to the drawings in the embodiments of the present invention. Obviously, the embodiments described herein are only part of the embodiments of the present invention, not all the embodiments. Based on the embodiments in the present invention, all other embodiments obtained by those of ordinary skill in the art without creative work shall fall within the protection scope of the present invention.

Figure 1:
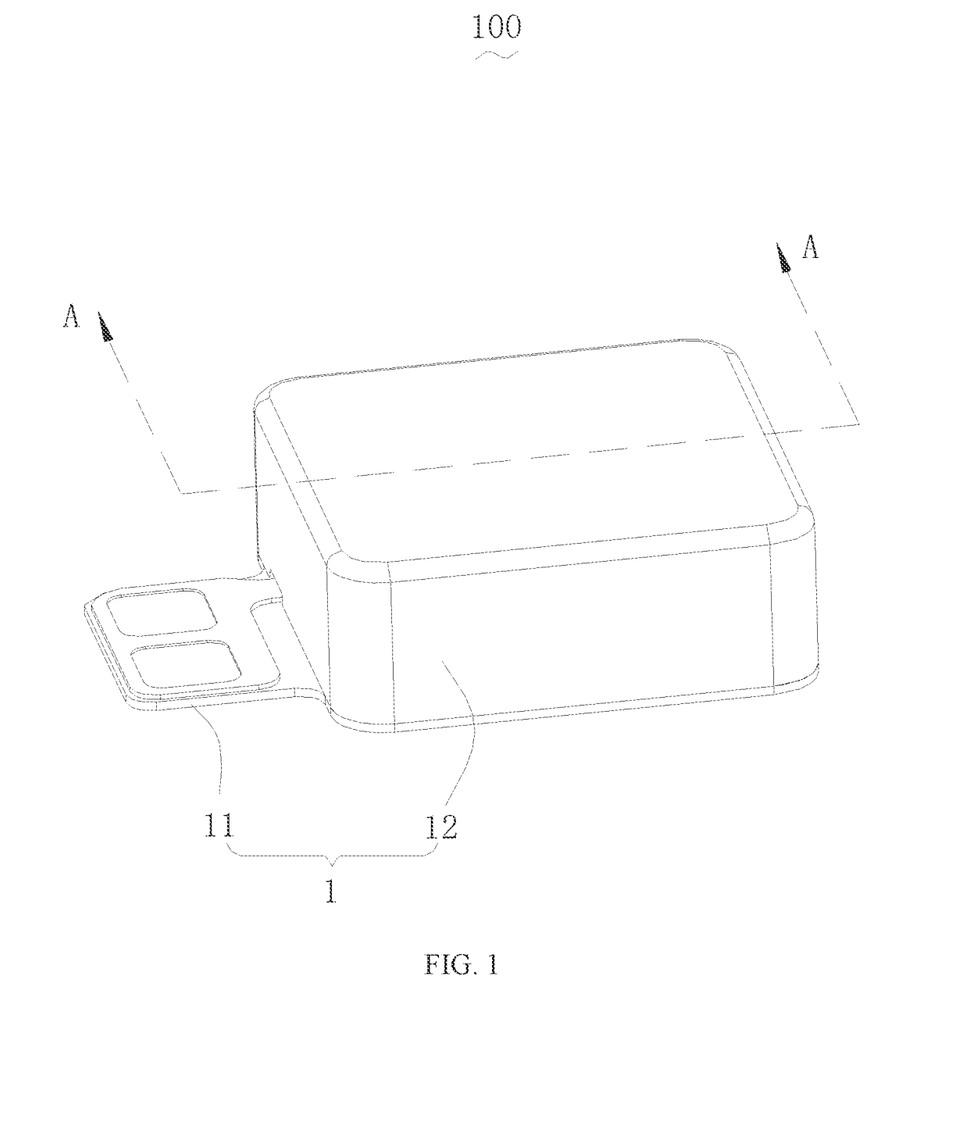
FIG. 1 is a schematic three-dimensional structural diagram of a linear vibration motor according to Embodiment I of the present invention.
Figure 2:
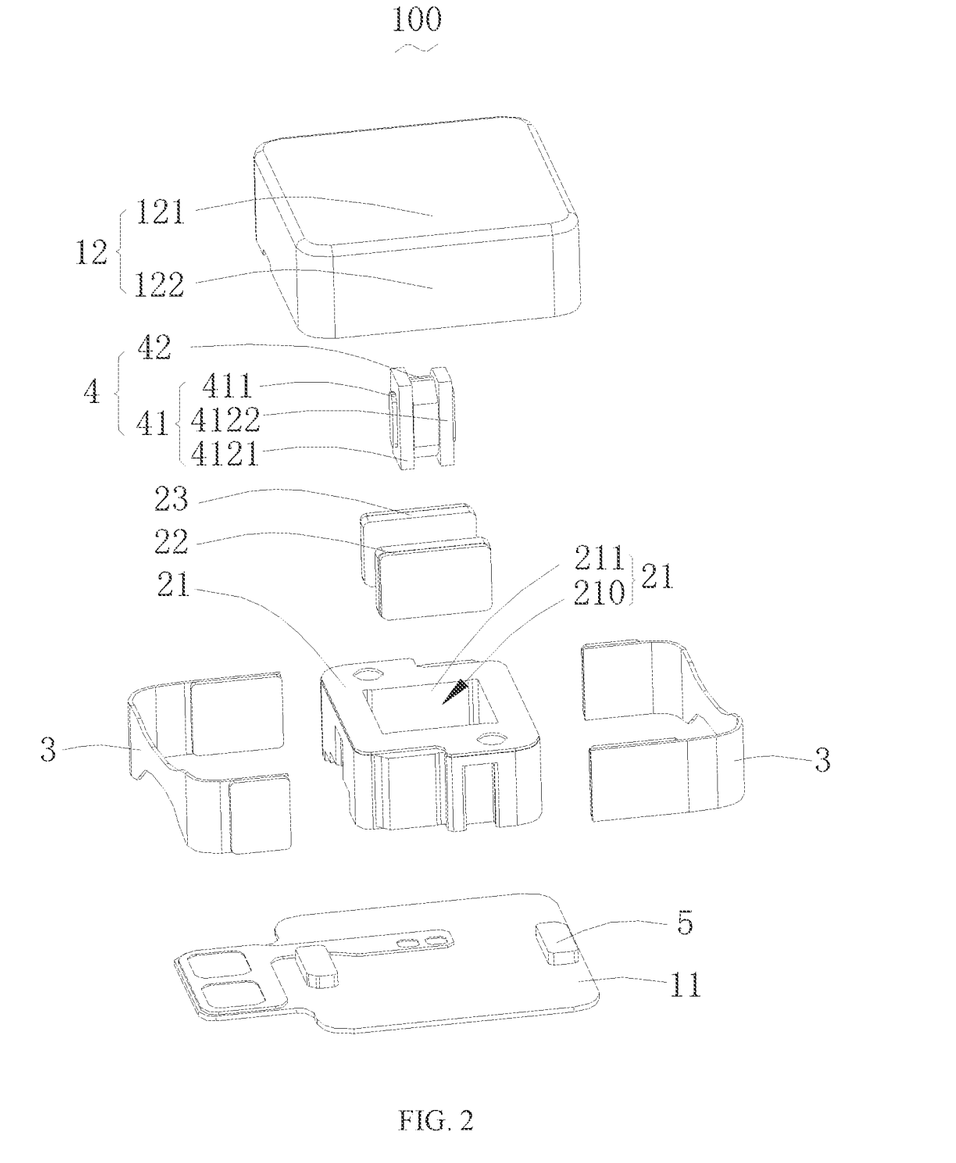
FIG. 2 is an exploded schematic structural diagram of a linear vibration motor according to Embodiment I of the present invention.
Figure 3:
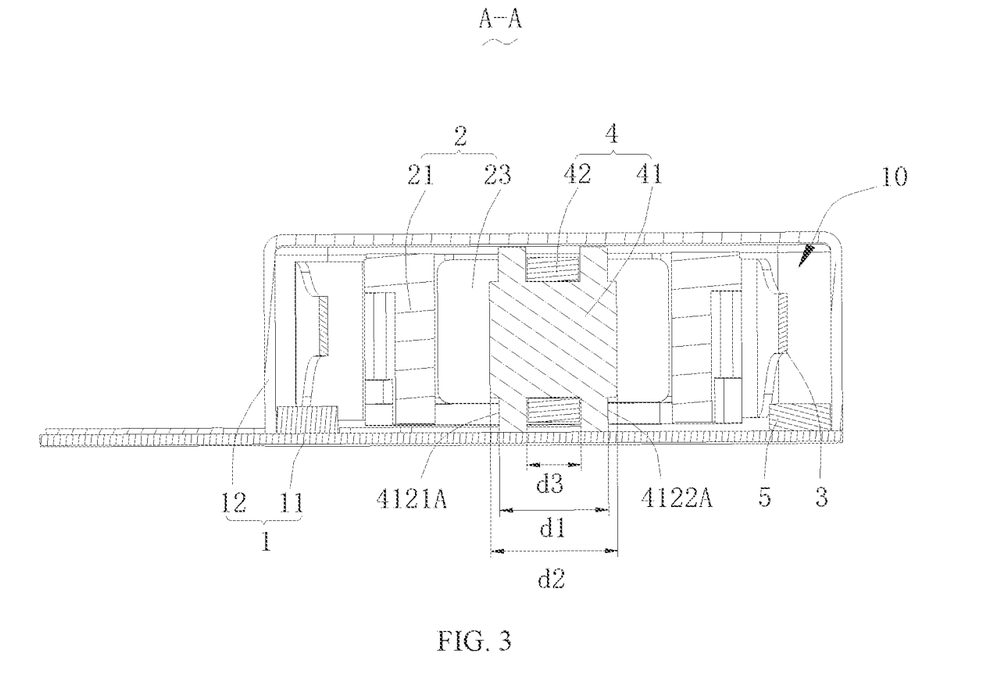
FIG. 3 is a sectional view of the linear vibration motor shown in FIG. 1 along line A-A.
Figure 4:
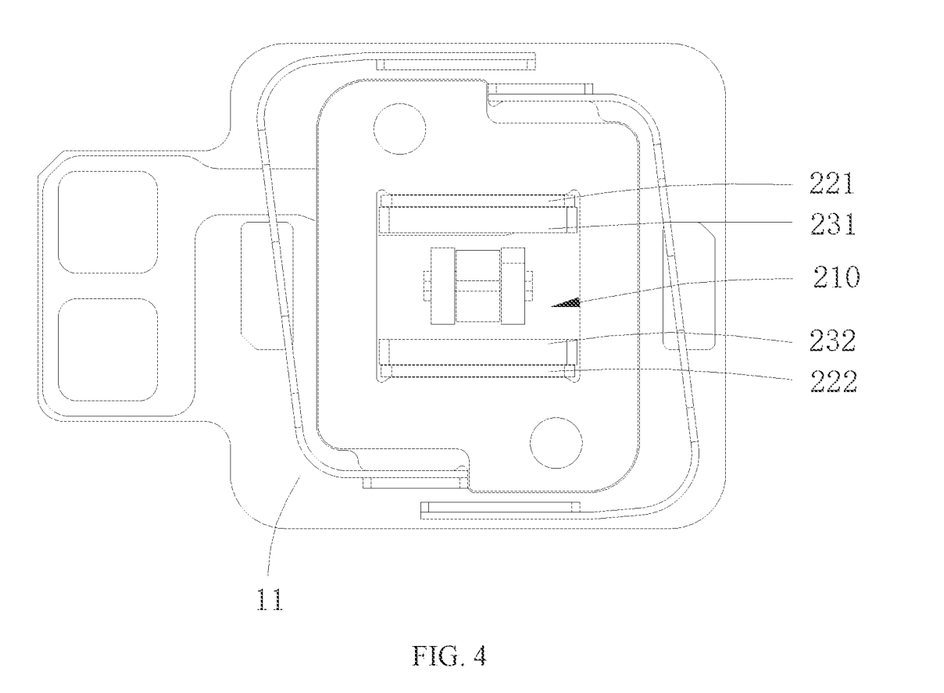
FIG. 4 is a top view of the linear vibration motor shown in FIG. 1 without an upper shell.
Figure 5:
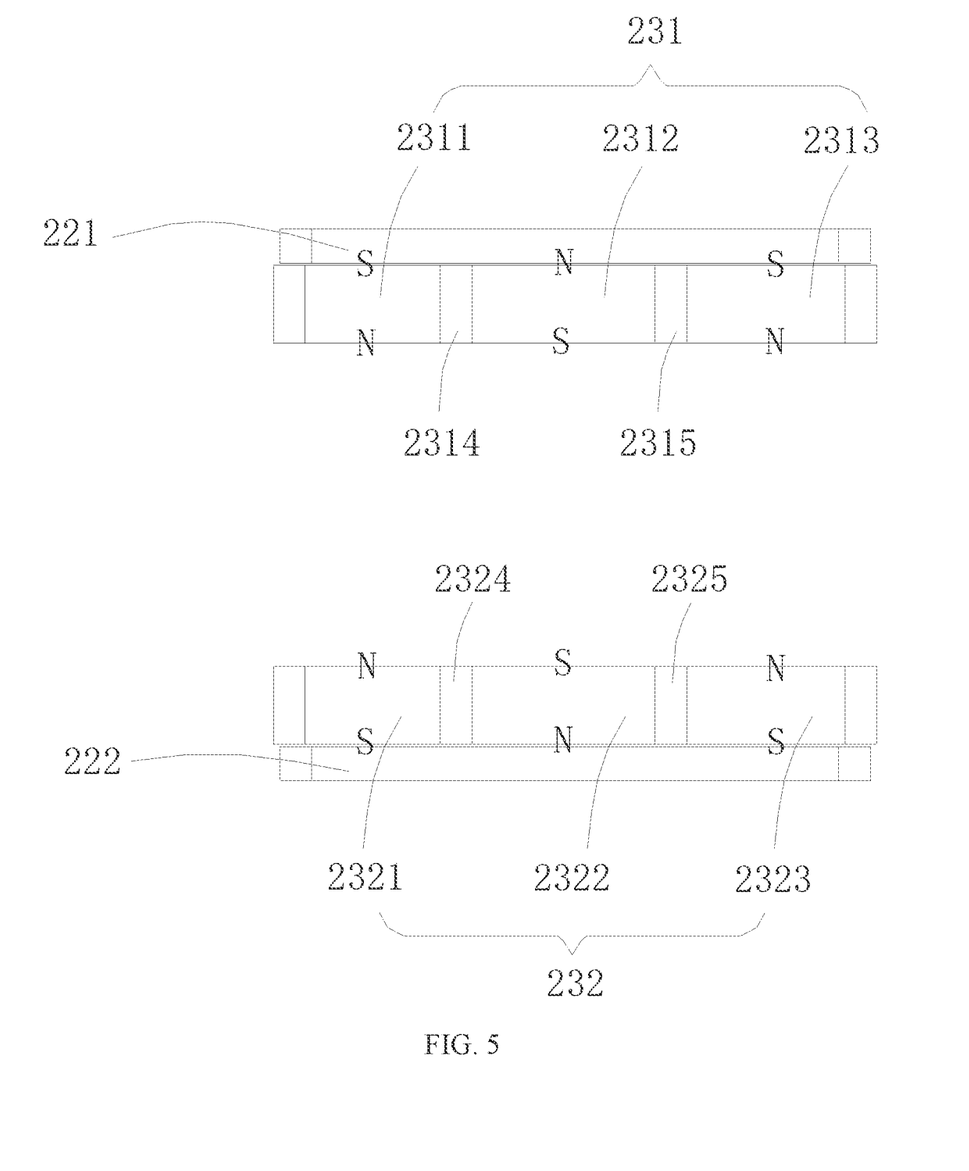
FIG. 5 is a schematic diagram of a magnetizing direction of a magnetic path structure shown in FIG. 2 in one current direction.
Figure 6:
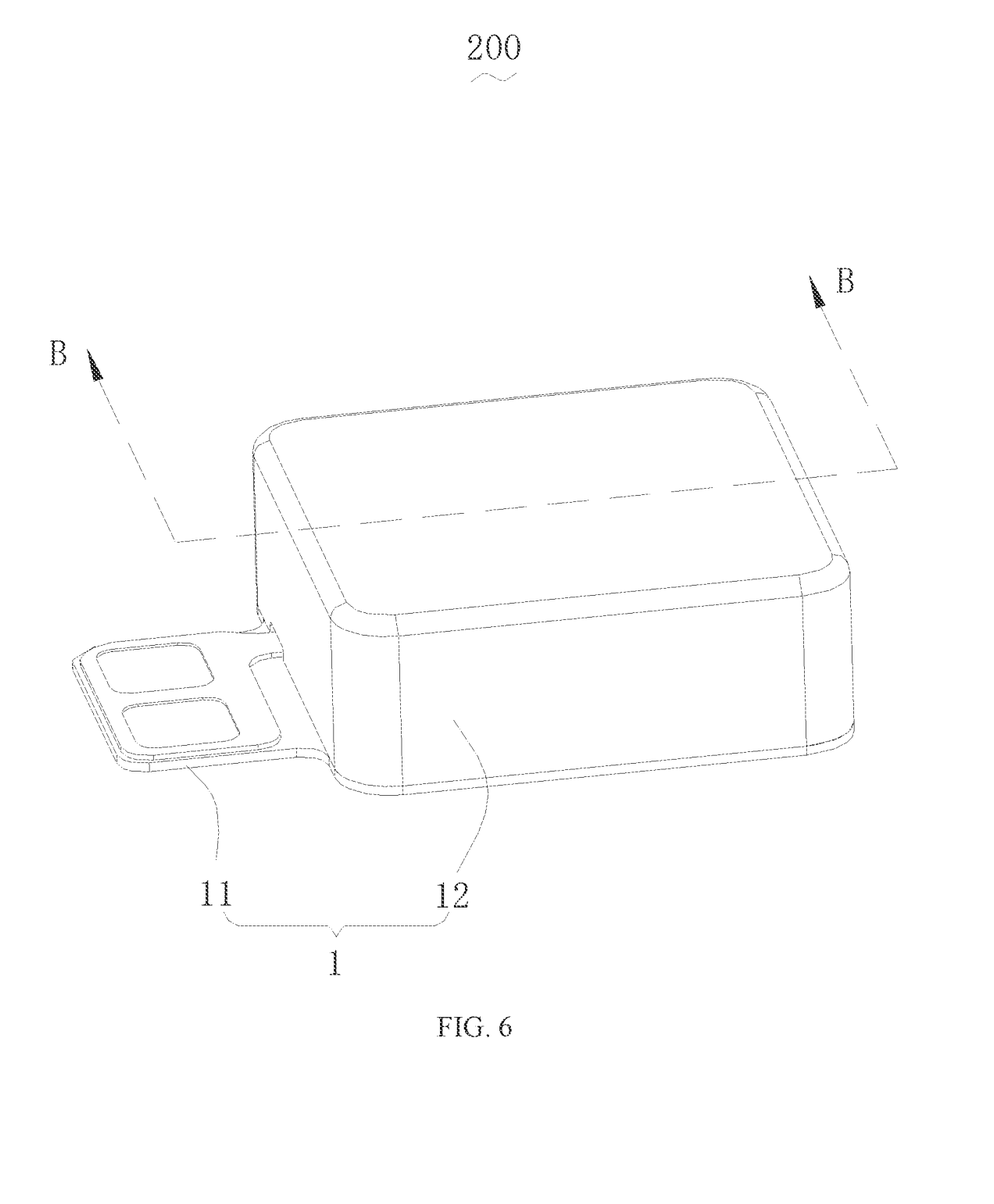
FIG. 6 is a schematic three-dimensional structural diagram of a linear vibration motor according to Embodiment II of the present invention.
Figure 7:
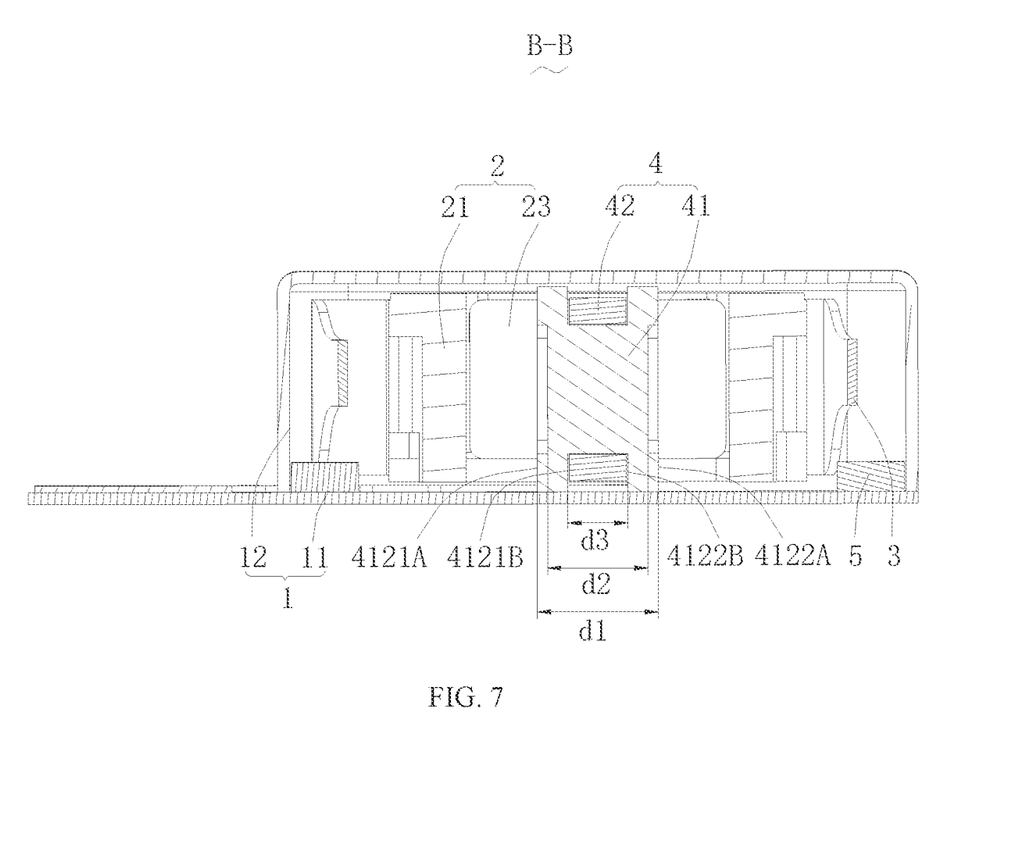
FIG. 7 is a sectional view of the linear vibration motor shown in FIG. 6 along line B-B.

Referring to FIGS. 1-5 at the same time, the present invention provides a linear vibration motor 100, including a housing 1, a vibration unit 2, an elastic member 3, and a coil assembly 4.

The housing 1 has a receiving space 10. The housing 1 includes a bottom plate 11, and an upper shell 12 which is covered on the bottom plate 11 and forms the receiving space 10 together with the bottom plate 11. The upper shell 12 includes a top plate 121 disposed opposite to the bottom plate 11, and a side plate 122 extending in a bent manner from the top plate 121 to the bottom plate 11. The bottom plate 11 is abutted with the side plate 122.

The vibration unit 2 is arranged in the receiving space 10. In this implementation, the vibration unit 2 is supported and suspended in the receiving space 10 through the elastic member 3. The linear vibration motor 100 further includes two limiting portions 5 received in the receiving space 10 and fixed to the bottom plate 11. The two limiting portions 5 are respectively located on two opposite sides of the bottom plate 11 along a vibration direction of the vibration unit 2 and are respectively abutted with the side plate 122. The arrangement of the limiting portions 5 can buffer the impact, perpendicular to the vibration direction, from the vibration unit 2 to the side plate 122 of the housing 1 when the vibration motor 100 falls off, so that the reliability of the linear vibration motor is improved.

Specifically, the vibration unit 2 includes a mass block 21, an electrode core 22, and a magnet 23.

The mass block 21 includes a through hole 210 and a hole wall 211 that is enclosed to form the through hole 210. The mass block 21 is made of a non magnetically permeable material.

The electrode core 22 is rectangular. The electrode core 22 is received in the through hole 210. Specifically, the electrode core 22 is fixed to the hole wall 211. The electrode core 22 includes a first electrode core 221, and a second electrode core 222 which is opposite to and spaced apart from the first electrode core. Specifically, long-axis directions of the first electrode core 221 and the second electrode core 222 are both parallel to the vibration direction of the vibration unit 2.

The magnet 23 is rectangular. The magnet 23 includes a first magnet 231, and a second magnet 232 which is opposite to and spaced apart from the first magnet. Specifically, the first magnet 231 and the second magnet 232 are respectively fixed to the first electrode core 221 and the second electrode core 222. Specifically, long-axis directions of the first electrode core 231 and the second electrode core 232 are both parallel to the vibration direction of the vibration unit 2.

The magnet 23 is magnetized perpendicular to the vibration direction of the vibration unit 2. More preferably, in order to increase the magnetic flux of the electrode core 22, the first magnet 231 and the second magnet 232 are both provided to have three sections of magnetizing structures for magnetization, and a non-magnetic region is arranged between adjacent magnetizing regions. Specifically, the first magnet 231 is provided with a first magnetizing region 2311, a second magnetizing region 2312, and a third magnetizing region 2313 in sequence along the long-axis direction of the first magnet 231; magnetizing directions of two adjacent magnetizing regions are opposite; and a first non-magnetic region 2314 and a second non-magnetic region 2315 are respectively arranged between the first magnetizing region 2311 and the second magnetizing region 2312 as well as between the second magnetizing region 2312 and the third magnetizing region 2313. The second magnet 232 is provided with a fourth magnetizing region 2321, a fifth magnetizing region 2322, and a sixth magnetizing region 2323 that have magnetizing directions opposite to those of the first magnetizing region 2311, the second magnetizing region 2312, and the third magnetizing region 2313; magnetizing directions of two adjacent magnetizing regions are opposite; and a third non-magnetic region 2324 and a fourth non-magnetic region 2325 are respectively arranged between the fourth magnetizing region 2321 and the fifth magnetizing region 2322 as well as between the fifth magnetizing region 2322 and the sixth magnetizing region 2323. Thus, circulation of magnetic lines is enhanced, and the magnetic field intensity is improved. The magnetic flux is correspondingly increased by about 10%, so that the vibration performance of the linear vibration motor 100 is good.

The elastic member 3 suspends the vibration unit 2 to the receiving space 10. Specifically, one end of the elastic member 3 is fixed to the vibration unit 2, and the other end of the elastic member 3 is fixed to the housing 1. Specifically, the elastic member 3 is connected to the side plate 122, that is, the elastic member 3 is fixed to the side plate 122 of the housing 1.

The coil assembly 4 is fixed to the housing 1, and drives the vibration unit 2 to vibrate. Specifically, the coil assembly 4 includes an iron core 41 inserted into the through hole 210 and spaced apart from the magnet 23, and a coil 42 wound on the iron core 41.

The iron core 41 includes an iron core body 411 extending along the vibration direction of the vibration unit 2, and iron core extension portions 412 sleeved at two ends of the iron core body 411. Specifically, the iron core extension portions 412 include a first iron core extension portion 4121 and a second iron core extension portion 4122. The iron core extension portions 412 extend perpendicular to the vibration direction until they are fixed to the bottom plate 11. An outside surface of the first iron core extension portion 4121 that faces away from the second iron core extension portion 4122 along the vibration direction is 4121A, and an outside surface of the second iron core extension portion 4122 that faces away from the first iron core extension portion 4121 along the vibration direction is 4122A. A surface distance between the two outside surfaces is d1, and a surface distance between two end surfaces of the iron core body 411 along the vibration direction is d2. The d1 and the d2 satisfy a conditional expression: $d1 \neq d2$.

Further, the d1 and the d2 satisfy a conditional expression: $d1 < d2$.

In other embodiments, an inside surface of the first iron core extension portion 4121 that faces to the second iron core extension portion 4122 along the vibration direction is 4121B, and an inside surface of the second iron core extension portion 4122 that faces to the first iron core extension portion 4121 along the vibration direction is 4122B. A surface distance between the two inside surfaces is d3. The d1, the d2, and the d3 satisfy a conditional expression: $d3 < d2 < d1$.

According to the vibration motor, the surface distance d1 between the two outside surfaces of the two iron core extension portions 412 that face away from the other iron core extension portions 412 along the vibration direction and the surface distance d2 between the two end surfaces of the iron core body 411 along the vibration direction are set to be unequal values, so that the two end portions of the iron core 41 on the plane perpendicular to the vibration direction have recess and bulge features. Without affecting other preparation processes, the coil assembly 4 is easier to locate and assemble. Further, when the d1 and the d2 satisfy the conditional expression $d1 < d2$, the feature that the two end portions of the iron core body 411 protrude relative to the outside surfaces 4121A and 4122A of the iron core extension portions 412 in the vibration direction can increase a driving force of the vibration unit 2 in the vibration direction of the linear motor, so that the vibration performance of the linear vibration motor 100 is improved.

The coil 42 is wound on the iron core body 411 along the vibration direction, and is located between the two magnets 23. An orthographic projection of the coil 42 on a plane perpendicular to the vibration direction partially overlaps orthographic projections of the iron core extension portions 412. A geometric center of each iron core extension portion 412 overlaps a geometric center of the coil 42 in the vibration direction. After the coil 42 is electrified, the iron core 41 forms a magnetic field which interacts with a magnetic field of the magnet 23, thus driving the vibration unit 2 to do reciprocating linear motion and achieving a vibration effect.

Compared with the prior art, the linear vibration motor 100 of the present invention has the advantages that the surface distance d1 between the two outside surfaces of the two iron core extension portions 412 that face away from the other iron core extension portions 412 along the vibration direction and the distance d2 between the two end surfaces of the iron core body 411 along the vibration direction are set to be two unequal values, so that the end portions of the iron core 41 on the plane perpendicular to the vibration direction have recess and bulge features. Without affecting other preparation processes, according to the linear vibration motor 100, the recess and bulge features are provided on the end portions of the iron core 41, so that the coil 42 assembly is easier to locate and assemble.

The implementation modes of the present invention are described above only. It should be noted that those of ordinary skill in the art can further make improvements without departing from the concept of the present invention. These improvements shall all fall within the protection scope of the present invention.

What is claimed is:

1. A linear vibration motor, comprising:
   a housing with a receiving space;
   a vibration unit arranged in the receiving space;
   an elastic member that suspends the vibration unit in the receiving space; and
   a coil assembly fixed to the housing and driving the vibration unit to vibrate,
   wherein the vibration unit comprises:
      a mass block with a through hole, and
      a magnet received in the through hole;
   the coil assembly comprises:
      an iron core inserted into the through hole and spaced apart from the magnet, and
      a coil fixed to the iron core;
   the iron core comprises:
      an iron core body used for winding the coil, and
      two iron core extension portions sleeved at two ends of the iron core body;
   the two iron core extension portions comprise a first iron core extension portion and a second iron core extension portion;
   the two iron core extension portions extend along a direction perpendicular to a vibration direction of the vibration unit to be fixed to the housing;
   surfaces of the two iron core extension portions that respectively face away from the other iron core extension portions along the vibration direction are outside surfaces, and surfaces of the two iron core extension portions that face to the other iron core extension portions along the vibration direction are inside surfaces;
   a surface distance between the two outside surfaces of the two iron core extension portions is d1; a surface distance between two end surfaces of the iron core body along the vibration direction is d2; and the d1 and the d2 satisfy a conditional expression: $d1 \neq d2$.

2. The linear vibration motor according to claim 1, wherein the d1 and the d2 satisfy a conditional expression: $d1 < d2$.

3. The linear vibration motor according to claim 2, wherein the coil is wound on the iron core body along the vibration direction; and an orthographic projection of the coil on a plane perpendicular to the vibration direction at least partially overlaps orthographic projections of the iron core extension portions.

4. The linear vibration motor according to claim 3, wherein a geometric center of each iron core extension portion overlaps a geometric center of the coil in the vibration direction.

5. The linear vibration motor according to claim 4, wherein the magnet comprises a first magnet, and a second magnet opposite to the first magnet; and the first magnet and the second magnet are magnetized perpendicular to the vibration direction and have opposite magnetic poles.

6. The linear vibration motor according to claim 5, wherein the first magnet is provided with a first magnetizing region, a second magnetizing region, and a third magnetizing region in sequence along the vibration direction; the first magnetizing region, the second magnetizing region, and the third magnetizing region are magnetized perpendicular to the vibration direction; magnetizing directions of the first magnetizing region and the second magnetizing region are opposite, and a first non-magnetic region is arranged between the first magnetizing region and the second magnetizing region; and magnetizing directions of the second magnetizing region and the third magnetizing region are opposite, and a second non-magnetic region is arranged between the second magnetizing region and the third magnetizing region.

7. The linear vibration motor according to claim 6, wherein the second magnet is provided in sequence, along the vibration direction, with a fourth magnetizing region, a fifth magnetizing region, and a sixth magnetizing region that have opposite magnetic poles to the first magnetizing region, the second magnetizing region, and the third magnetizing region; the fourth magnetizing region, the fifth magnetizing region, and the sixth magnetizing region are magnetized perpendicular to the vibration direction; magnetizing directions of the fourth magnetizing region and the fifth magnetizing region are opposite, and a third non-magnetic region is arranged between the fourth magnetizing region and the fifth magnetizing region; and magnetizing directions of the fifth magnetizing region and the sixth magnetizing region are opposite, and a fourth non-magnetic region is arranged between the fifth magnetizing region and the sixth magnetizing region.

8. The linear vibration motor according to claim 1, wherein a surface distance between the two inside surfaces of the two iron core extension portions is d3, and the d1, the d2, and the d3 satisfy a conditional expression: d3<d2<d1.

9. The linear vibration motor according to claim 8, wherein the coil is wound on the iron core body along the vibration direction; and an orthographic projection of the coil on a plane perpendicular to the vibration direction at least partially overlaps orthographic projections of the iron core extension portions.

10. The linear vibration motor according to claim 9, wherein a geometric center of each iron core extension portion overlaps a geometric center of the coil in the vibration direction.

11. The linear vibration motor according to claim 10, wherein the magnet comprises a first magnet, and a second magnet opposite to the first magnet; and the first magnet and the second magnet are magnetized perpendicular to the vibration direction and have opposite magnetic poles.

12. The linear vibration motor according to claim 11, wherein the first magnet is provided with a first magnetizing region, a second magnetizing region, and a third magnetizing region in sequence along the vibration direction; the first magnetizing region, the second magnetizing region, and the third magnetizing region are magnetized perpendicular to the vibration direction; magnetizing directions of the first magnetizing region and the second magnetizing region are opposite, and a first non-magnetic region is arranged between the first magnetizing region and the second magnetizing region; and magnetizing directions of the second magnetizing region and the third magnetizing region are opposite, and a second non-magnetic region is arranged between the second magnetizing region and the third magnetizing region.

13. The linear vibration motor according to claim 12, wherein the second magnet is provided in sequence, along the vibration direction, with a fourth magnetizing region, a fifth magnetizing region, and a sixth magnetizing region that have opposite magnetic poles to the first magnetizing region, the second magnetizing region, and the third magnetizing region; the fourth magnetizing region, the fifth magnetizing region, and the sixth magnetizing region are magnetized perpendicular to the vibration direction; magnetizing directions of the fourth magnetizing region and the fifth magnetizing region are opposite, and a third non-magnetic region is arranged between the fourth magnetizing region and the fifth magnetizing region; and magnetizing directions of the fifth magnetizing region and the sixth magnetizing region are opposite, and a fourth non-magnetic region is arranged between the fifth magnetizing region and the sixth magnetizing region.

14. The linear vibration motor according to claim 1, wherein the mass block is made of a non magnetically permeable material.

* * * * *